(12) United States Patent
Milhizer

(10) Patent No.: US 9,332,132 B1
(45) Date of Patent: May 3, 2016

(54) SYSTEM AND METHOD FOR RECLAIMING OBLIGATED NETWORK RESOURCES

(71) Applicant: TSC ACQUISITION CORPORATION, Los Angeles, CA (US)

(72) Inventor: Eric Milhizer, Dallas, TX (US)

(73) Assignee: TSC Acquisition Corporation, Los Angeles, CA (US)

( * ) Notice: Subject to any disclaimer, the term of this patent is extended or adjusted under 35 U.S.C. 154(b) by 0 days.

(21) Appl. No.: 14/693,639

(22) Filed: Apr. 22, 2015

Related U.S. Application Data

(60) Provisional application No. 62/084,996, filed on Nov. 26, 2014.

(51) Int. Cl.
| | |
|---|---|
| H04M 15/00 | (2006.01) |
| H04W 76/02 | (2009.01) |
| H04W 4/00 | (2009.01) |
| H04W 76/06 | (2009.01) |
| H04W 4/24 | (2009.01) |

(52) U.S. Cl.
CPC ............ *H04M 15/58* (2013.01); *H04M 15/785* (2013.01); *H04M 15/8207* (2013.01); *H04M 15/8214* (2013.01); *H04W 4/24* (2013.01); *H04W 76/066* (2013.01)

(58) Field of Classification Search
CPC ..... H04W 16/14; H04W 24/00; H04W 28/16; H04W 4/22; H04W 28/04; H04W 72/00; H04W 16/10; H04W 24/02; H04W 72/0413; H04W 8/24; H04W 16/32; H04W 36/0022; H04W 48/02; H04W 4/005; H04W 4/12
USPC ............ 455/452.1, 454, 509, 466, 406, 41.2, 455/436, 438, 446, 447, 450, 452.2, 518, 455/560; 370/329, 331, 336, 236, 252, 330, 370/216, 217, 225, 230, 254, 310, 311, 315, 370/328, 350, 352, 392, 477
See application file for complete search history.

(56) References Cited

U.S. PATENT DOCUMENTS

| | | | |
|---|---|---|---|
| 2003/0133552 A1* | 7/2003 | Pillai et al. ................ | 379/114.2 |
| 2003/0149759 A1* | 8/2003 | Hetherington et al. ....... | 709/223 |
| 2008/0240144 A1* | 10/2008 | Kruse et al. .................. | 370/449 |
| 2009/0168696 A1* | 7/2009 | Lindstr m et al. ............ | 370/328 |
| 2009/0320035 A1* | 12/2009 | Ahlgren et al. ............... | 718/104 |
| 2011/0264816 A1* | 10/2011 | Lischka ............. | G06F 21/6218 |
| | | | 709/229 |
| 2014/0059158 A1* | 2/2014 | Chen et al. ................... | 709/213 |
| 2014/0108663 A1* | 4/2014 | Peters et al. ................. | 709/226 |
| 2014/0215227 A1* | 7/2014 | Sivasubramanian et al. . | 713/193 |
| 2015/0065129 A1* | 3/2015 | Lee et al. .................... | 455/435.1 |
| 2015/0079533 A1* | 3/2015 | Lowe ............................ | 433/24 |

* cited by examiner

*Primary Examiner* — Inder Mehra
(74) *Attorney, Agent, or Firm* — Dentons US LLP

(57) ABSTRACT

A system and method for reducing obligated network resources may include establishing network resources obligated to serve a user for use of a networked electronic device on a communications network. Network usage data of the networked electronic device of the user operating on the communications network over a time period may be collected in a data repository. A determination may be made by the computing device as to whether the network usage data exceeds a minimum usage threshold level over the time period. In response to the computing device determining that the network usage data exceeds the usage threshold level over the time period, the network resources obligated to serve the user may be maintained. Otherwise, the network resources obligated to serve the user may be caused to be released, thereby reducing obligated network resources.

23 Claims, 3 Drawing Sheets

SYSTEM AND METHOD FOR RECLAIMING OBLIGATED NETWORK RESOURCES

RELATED APPLICATIONS

This Application claims priority to U.S. Provisional Patent Application Ser. No. 62/084,996, filed Nov. 26, 2014 and entitled "SYSTEM AND METHOD FOR RECLAIMING OBLIGATED NETWORK RESOURCES," the entire contents of which is hereby incorporated by reference.

BACKGROUND

Telecommunications service providers are more competitive than ever before as the cost of telecommunications services and network resources have dramatically decreased over the years due to improved technology and more competition. As a result, telecommunications service providers compete in a variety of different ways to attract new subscribers, maintain existing subscribers, and increase spend by subscribers for network services.

One problem that exists with consumer-facing companies is the use of contractually obligated promotional offers to compete for new subscribers. Such promotional offers bind the company in being obligated to support legacy services and, in the case of telecommunications service providers, network provisioning and resources must be maintained for long periods of time, sometimes unlimited amounts of time depending on the promotional offer and service plans that are used to attract and maintain subscribers. Such offers result in the company losing money simply due to having to meet the contractual obligations. As an example, offers of network resources, such as a certain amount (e.g., 500 MB) of data communications that last a lifetime that are offered to new subscribers, cause the telecommunications service provider to have to maintain the obligated network resources until the customer fully consumes the network resources. As understood in the art, network resources may include a wide variety of sources used to support subscriber usage, such as memory in a data repository, bandwidth on communications lines, phone numbers, network addresses, local network voice capacity, international network voice capacity, data streaming capacity, messaging capacity, and so on.

Over time, the contractually obligated resources becomes a major liability for a telecommunications service provider, especially a mobile virtual network operator (MVNO), for a number of reasons, such as having to pay for a telephone number whether or not being utilized by a customer, maintain allocated network resources provided by third parties, manage accounts, etc. Certain service plans that are relatively low margin, such as Lifeline service plans that are paid by the government for low income people, are particularly competitive such that network resource incentives are given to drive subscribers to the telecommunications service providers offering the incentives. The subscribers, however, often do not fully utilize the contractually obligated network resources, but those network resources still have to be maintained. Moreover, if a customer moves, dies, or is otherwise incapacitated and the telecommunications service provider is not notified of the customer's status, the allocated network resources may remain and cost the service provider. Alternatively, the service provider may spend a lot of money to track down the status of the customer in an attempt to alleviate the maintenance costs of the allocated network resources.

In the event that the contractual obligations of the allocated network resources are not met by the communications service provider, consumer fraud charges and large fines may result from both consumer complaints, class action litigation, and governmental litigation. As a result, there is a need to reduce or eliminate obligated network resources that result from promotional offers and service plans.

SUMMARY

In order to reduce liability of obligated network resources for communications service providers, network usage of a user may be monitored, and, in the event of determining that the user has used the network services over a certain time period, then the obligated network resources may be maintained, otherwise, if the user has failed to utilize network services over the certain time period, then the obligated network resources may be released so as to reduce obligated network resources. By eliminating obligated network resources, improved efficiency on a telecommunications network may result.

More particularly, a method for reducing obligated network resources may include establishing, by a computing device, network resources obligated to serve a user for use of a networked electronic device on a communications network. Network usage data of the networked electronic device of the user operating on the communications network over a time period may be collected in a data repository. A determination may be made by the computing device as to whether the network usage data exceeds a minimum usage threshold level over the time period. In response to the computing device determining that the network usage data exceeds the usage threshold level over the time period, the network resources obligated to serve the user may be maintained. Otherwise, in response to the computing device determining that the network usage data does not exceed the usage threshold level over the time period, the network resources obligated to serve the user may be caused to be released, thereby reducing obligated network resources.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
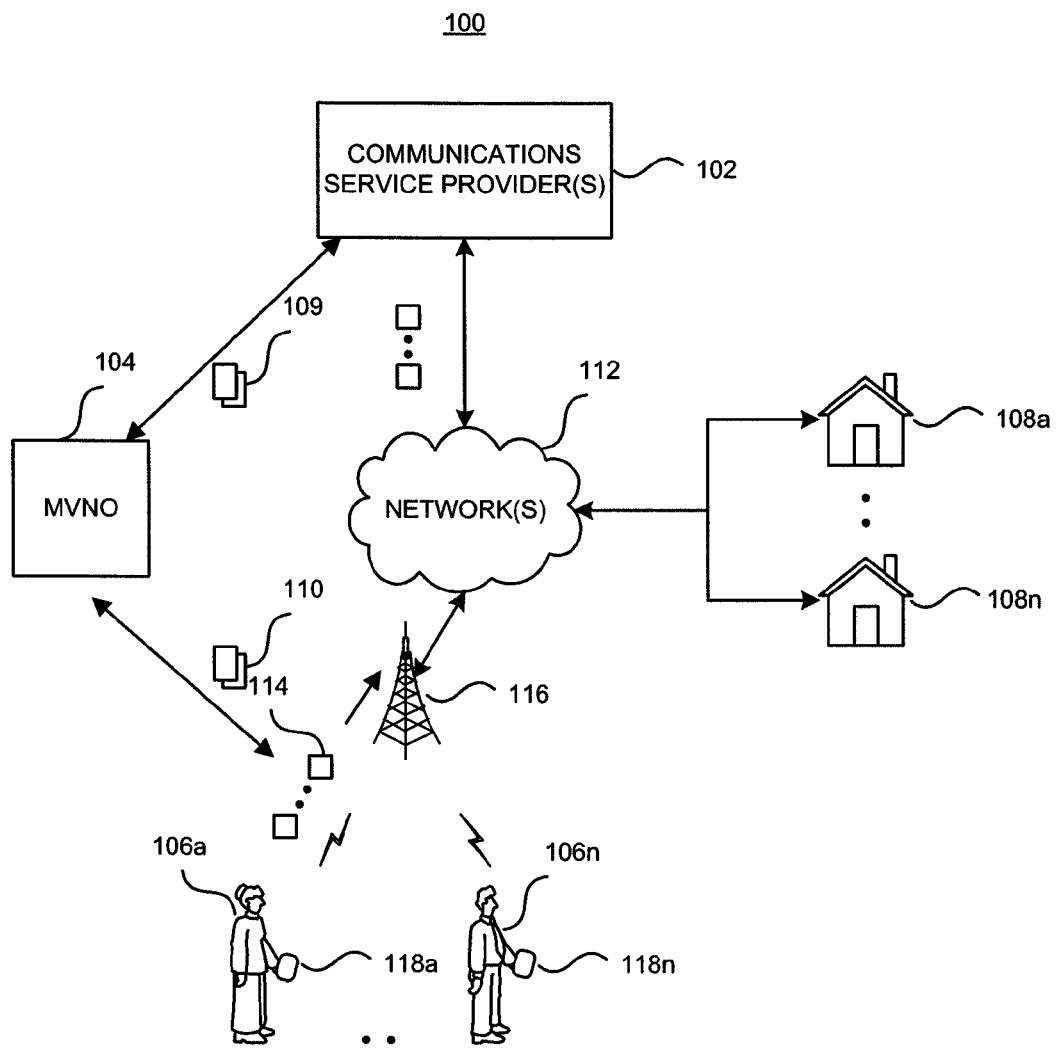
FIG. 1 is an illustration of an illustrative network services environment in which communications service provider(s) and/or mobile network virtual operator (MVNO) provide network resources to subscribers.

With regard to FIG. 1, an illustration of an illustrative network services environment 100 in which communications service provider(s) 102 and/or mobile network virtual operators (MVNO) 104 provide network resources to subscribers 106a-106n (collectively 106) and 108a-108n (collectively 108) is shown. The subscribers 106 may be mobile device subscribers, while the subscribers 108 may use home-based communications devices, such as telephones and computers. As understood in the art, MVNOs 104 may have agreements 109 with the communications service providers 102 to provide communications services to the subscribers 106 and/or 108 using network resources provided by the communication service providers 102. In providing those communications services, MVNOs 104 may have agreements 110 with the subscribers 106 and/or 108 that established relationships and services to be provided by the MVNOs 104 to the subscribers 106 and/or 108.

In one embodiment, the communications services providers(s) 102 and MVNOs 104 may offer promotional services, such as certain amounts of data communications (e.g., 500 MB of data communications) that are non-reusable. That is, the network resources offered in promotional marketing by the MVNO(s) 104 and communications service provider(s) 102 are often unlimited in time, which often causes problems in the event that a customer does not use all of the network resources from the promotional offerings because those obligated network resources are to be maintained indefinitely for the customer.

More particularly, network(s) 112 may be utilized to communicate signals 114, typically in the form of digital data packets. The network(s) 112, if configured to support mobile communications, may include mobile towers 116 or other antenna configuration to enable the subscribers 106 to communicate via mobile electronic devices 118a-118n (collectively 118). As understood in the art, a variety of network devices, such as routers, switches, storage devices, etc. that provide for network services to the subscribers 106 and/or 108 are provided, and these network devices are limited in resources (e.g., bandwidth, capacity, memory, etc.).

Network resources that are typically offered for promotional services to attract the subscribers 106 and/or 108 include, but are not limited to, voice services, data communications, such as text, download volume, data storage, roaming, international calling, and so forth. The network resources may be offered as "forever" or non-reusable, obligated network resources obligations, such as pay $10 for 10,000 text messages. In the event that those 10,000 text messages are not fully consumed by the customer, those network resources remain an obligation by the communications services provider or MVNO.

Figure 2:
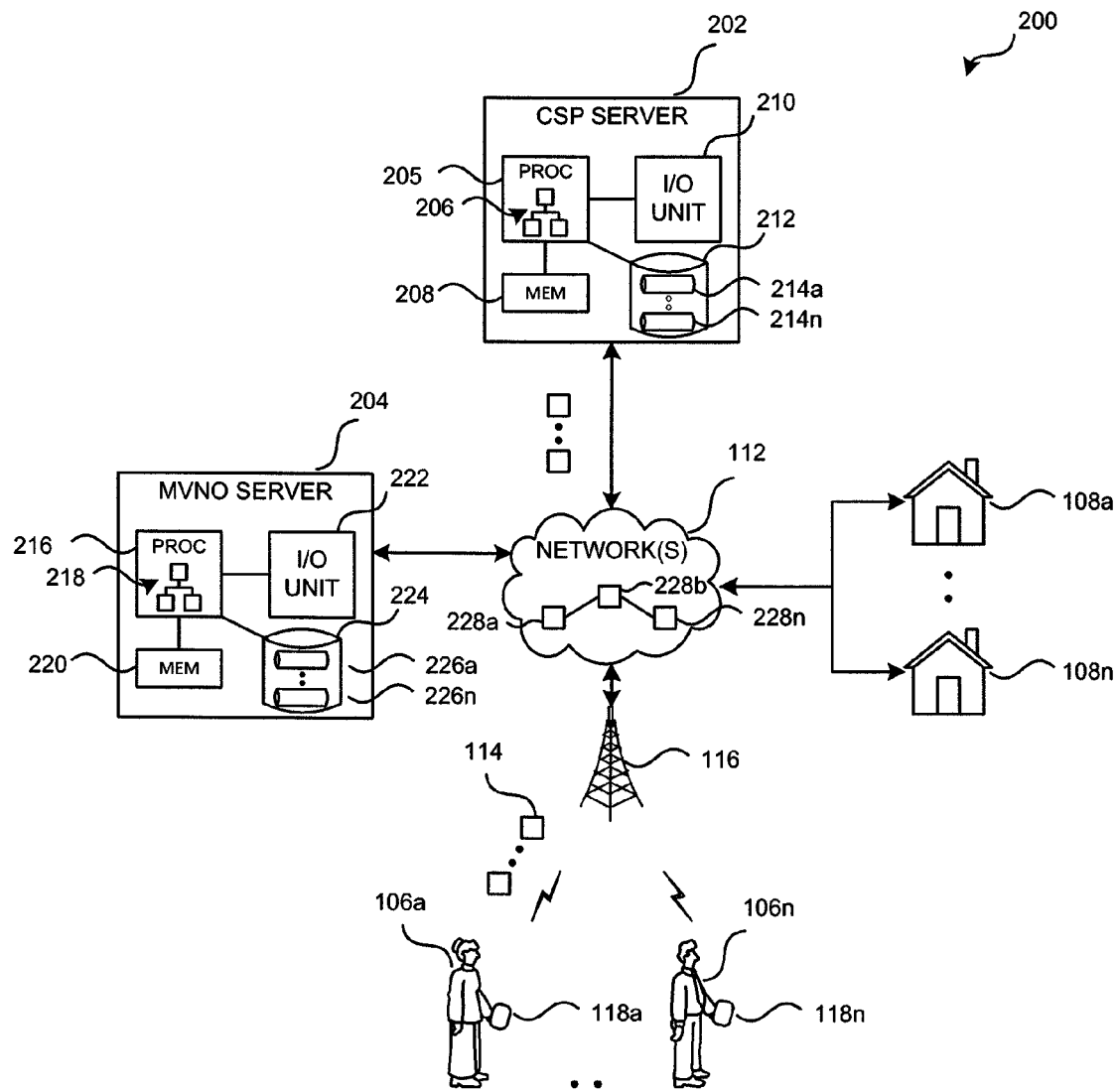
FIG. 2 is a block diagram of an illustrative network environment in which communications service provider(s) and/or mobile network virtual operator (MVNO) provide network resources to subscribers.

With regard to FIG. 2, a block diagram of an illustrative network environment 200 in which a communications service provider(s) server 202 and/or mobile network virtual operator server 204 may be utilized to provide and manage network resources to subscribers 106 is shown. The communications service provider server 202 may include a processing unit 205 that executes software 206 to manage network resources for the subscribers 106. The processing unit 205 may include one or more processors, as understood in the art. The processing unit 205 may be in communication with a memory unit 208, input/output (I/O) unit 210, and storage unit 212. The storage unit 212 may store data repositories 214a-214n (collectively 214). The data repositories 214 may store information associated with the subscribers 106 and/or 108, which may include obligated network resources to be served to the subscribers 106.

The communications service provider server 204 may include a processing unit 216 that executes software 218 to manage network resources for the subscribers 106. The processing unit 216 may include one or more processors, as understood in the art. The processing unit 216 may be in communication with a memory unit 220, input/output (I/O) unit 222, and storage unit 224. The storage unit 224 may store data repositories 226a-226n (collectively 226). The data repositories 226 may store information associated with the subscribers 106 and/or 108, which may include obligated network resources to be served to the subscribers 106 and/or 108.

The software 206 and/or 218 may be configured to establish and manage obligated network resources for the subscribers 106 and/or 108. In managing the obligated network resources, the communications service provider and MVNO may maintain information indicative of network resource for which the communications service provider and MVNO are obligated to provide the subscribers 106 and/or 108 on a contractual basis. These network resources are to maintained for the duration of the contractual obligation, which may be indefinite depending on promotional and/or contractual offers.

Communications network equipment 228a-228n (collectively 228) may include servers, routers, switches, hubs, bridges, mobile communications equipment (e.g., base stations), public switched telephone network equipment (e.g., SS7 network equipment), voice over IP (VOIP) network equipment, and so on. One or more of the communications network equipment 228 may be utilized to determine usage and/or certain types of usage (e.g., voice, data, local, regional, international, roaming, etc.) and report that usage to the CSP server 202 for processing thereat or communicating the usage or a derivative thereof (e.g., monthly statements of subscribers of the MVNO). The measured usage may be utilized to reclaim obligated network resources, as further described herein.

Figure 3:
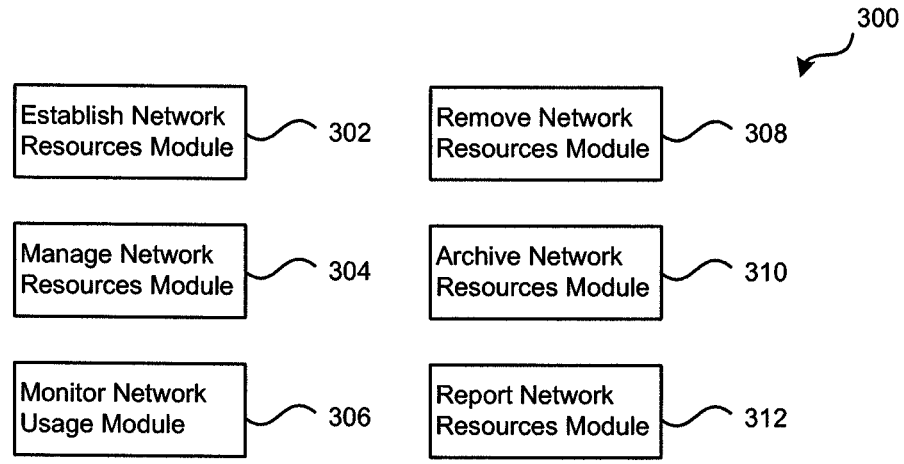
FIG. 3 is a block diagram of illustrative modules utilized to reduce network resources allocated to users.

With regard to FIG. 3, a block diagram of illustrative modules utilized to reduce network resources allocated to users is shown. The modules 300 may include an establish network resources module 302 that may be configured to establish network resources for subscribers based on promotional offers and/or contractual obligations offered and agreed to by the communications service provider or MVNO with the subscribers. In establishing the network resources, the module 302 may record network resource parameters in a data repository network resources obligated to provide individual subscribers based on respective subscription agreements. For example, if the subscriber has been offered a certain amount of data download (e.g., 500 MB) for his or her lifetime, then the module 302 may establish 500 MB as a total amount of data download that the subscriber has available for the lifetime of the subscriber. Other network resources are possible promotional offerings, as well, as further described herein.

A manage network resources module 304 may be configured to manage network resources for subscribers of a communications services provider and/or MVNO. The module 304 may be configured to manage obligated network resources, such as those that are offered in promotional offers. For example, in the case where the subscriber is to receive 500 MB of data download, and the module 304 may be configured to reduce the amount of network resources to be provided to the subscriber based on actual usage by the subscriber. The module 304 may be configured to manage resources available to individual subscribers as well as manage aggregated network resources obligated to serve some or all of the subscribers of the communications service provider and/or MVNO so that network infrastructure capacity, budgeting, or any other technical and/or financial consideration may be made.

A monitor network usage module 306 may monitor network usage by subscribers. In monitoring network usage, the module 306 may monitor whether a subscriber places telephone calls, utilizes data, or otherwise accesses a communications network. The monitoring may be performed in conjunction with switches, routers, and other network communications systems utilized to perform network communications services for subscribers, where communications performed by subscribers may be determined through inclusion of mobile identification numbers (MINs), Internet Protocol (IP) address, media access control (MAC) address, and/or any other identifiers associated with an electronic device that communicates over a communications network, as understood in the art. As communications from an electronic device over a communications network are performed, usage information may be monitored and collected by the network equipment and communicated to the CSP server 202 (FIG. 2) or other computing system configured to receive and process the measured usage data, so that the module 306 may receive, directly (if operating in the CSP server 202) or indirectly (if operating in the MVNO server 204 of FIG. 2) from the network equipment or CSP server 202, and process that usage information for use in determining whether or not to reclaim the obligated network resources, as further described herein. In one embodiment, obligated network resources may be driven by usage of the network by the subscriber so as to maintain the obligated network resources for the subscribers. The module 306 may monitor network usage over a period of time, such as two months. If the module 306 is being executed by a server of a communications service provider, the module 306 may receive data from one or more modules being executed in network equipment. If the module 306 is being executed by a server of an MVNO, then the module may receive data from a server of a communications service provider as the MVNO does not operate or manage network equipment, as understood in the art. The data provided to an MVNO may be in the form of usage data, as understood in the art, and the module 306 may offset data associated with individual subscribers being managed by the MVNO. The modules 304 and 306 may be utilized in combination to determine whether subscribers use network resources over a certain time period, and, responsive to determining that a subscriber has not used network resources over a given time period, cause obligated network resources to be removed or otherwise altered, as further described herein. Other minimum thresholds may be utilized, as well, to determine whether the subscriber is to maintain obligated network resources depending on contractual obligations with a subscriber.

A remove network resources module 308 may be configured to remove network resources obligated to serve subscribers. In removing the network resources, the module 308 may be configured to alter data records stored in a data repository that indicates obligated network resources to provide to subscribers. For example, if a subscriber is contractually provided 500 MB of download data over his or her lifetime, then a data record may be altered or eliminated, thereby reducing liability for the communications service provider or MVNO. As a result, network capacity may be increased, and expenditure to support the obligations may be reduced.

An archive network resources module 310 may be configured to archive information associated with a subscriber's network resources in response to the module 308 removing the network resources for the subscriber. By removing the information, and hence the actual network resources for the subscriber, efficiency of a data repository that services operations may be improved, and communications network services may also be made more efficient. In archiving the network resources by module 310, information representative of an amount of network resources that had previously been allocated to the subscriber at the time that the obligated network resources were removed may be stored in a non-operational data repository (i.e., an archive data repository), thereby reducing the size of the operational data repository and improving efficiency thereof. Having an archive data repository maintains a record of the allocated and obligated network resources for the subscriber for management and other purposes.

A report network resources module 312 may be configured to generate and produce reports for operators of communications service providers and/or MVNO's to view. These reports may list obligated network resources so that the operators may determine obligations for subscribers based on contractual obligations in providing network resources for the subscribers.

Figure 4:
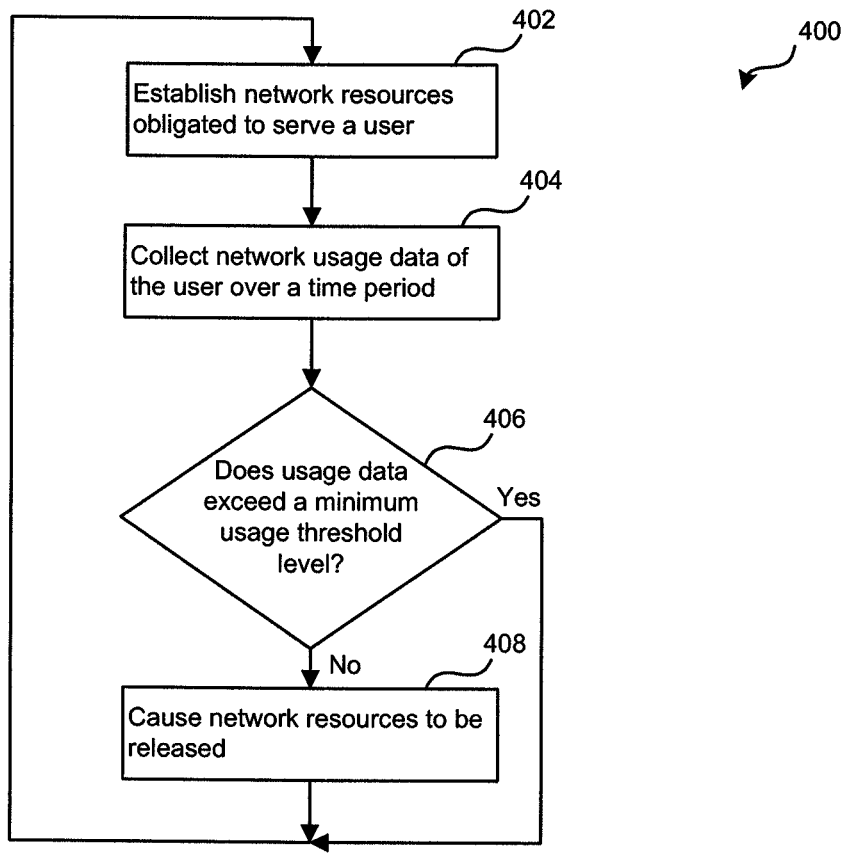
FIG. 4 is a flow diagram of an illustrative process for reducing allocated network resources.

With regard to FIG. 4, a flow diagram of an illustrative process 400 that is used to manage network resources is shown. The process 400 may start at step 402, where network resources obligated to serve a subscriber may be established. In establishing obligated network resources, a data record associated with the subscriber may be established in a data repository to manage the obligated network resources for the subscriber. At step 404, network usage data of the subscriber may be collected over a time period. For example, the time period may be 60 days, 90 days, or any other time period over which the maintenance of the obligated network resources are to be maintained in the event that the subscriber accesses the network during that time period.

At step 406, a determination may be made as to whether usage data exceeds a minimum usage threshold level. In one embodiment, usage threshold level may be zero minutes. Alternatively, the usage threshold level may be any other amount of time consistent with a policy to maintain obligated network resources for the subscriber. At step 408, if the usage data does not exceed the minimum usage threshold level (e.g., 0 minutes), then the process may cause the network resources to be released. In releasing the network resources, the obligated network resources may be changed from a remaining balance to a zero balance, for example. The process may thereafter return to step 402. If it is determined at step 406 that the usage data does not exceed a minimum usage threshold level, then the process may also return to step 402.

In an embodiment, a determination as to whether the network usage data does not exceed a maximum threshold level may be determined. The maximum threshold level may be a dynamic level that matches or is associated with an available balance of non-reusable, obligated network resources associated with the user. For example, if the user has an amount of non-reusable, obligated network resources available, then those non-reusable, obligated network resources may be drawn to provide continued network resources and the non-reusable, obligated network resources may be released, as previously described.

In one embodiment, establishing network resources may include allocating a predetermined amount of data communications services for the user to consume with data communications. Allocating the predetermined amount of data communication services for the user to consume may include allocating a data rate at which the data communications services is to communicate data for the user. Allocating a predetermined amount of data communications services may also or additionally include allocating a predetermined number of data messages for the user to communicate.

In one aspect, establishing network resources may include allocating a predetermined amount of data storage available for the user of the networked electronic device to access to store data. Allocating a predetermined amount of data storage may include allocating the predetermined amount of storage without the ability to reuse the predetermined amount of storage after storing data therein. Establishing network resources may include establishing the network resources without establishing an expiration date for the user to consume the network resources. Collecting network usage data over a predetermined time period may include collecting the network usage data over a multi-month time period.

In one embodiment, causing the network resources to be released may include deleting data in a data storage unit. The network resources may be caused to be released by (i) deallocating a network address associated with the networked electronic device of the user, and (ii) turning the network address back into a routing guide inclusive of network addresses of multiple service providers for reallocation to another user. In one embodiment, deallocating a network address includes deallocating a telephone number.

Still yet, establishing the network resources obligated to serve a user for a networked electronic device may include establishing the network resources obligated to serve the user to use a mobile device. Establishing network resources may include establishing roaming time on at least one second communications network for use by the user of the networked electronic device. Establishing network resources may also include establishing international communications time for use by the user of the networked electronic device. In one embodiment, the network resources are secondary network resources to a primary network resource of which the user uses the networked electronic device on the communications network, where the primary network resources are talk time.

In one embodiment, a determination as to whether the network usage data exceeds a second threshold level may be made, and, in response to determining that the network usage data exceeds the second threshold level, the network resources obligated to serve the user may be caused to be released, thereby reducing the obligated network resources, otherwise, in response to determining that the network usage data does not exceed the second threshold level, the network resources obligated to serve the user may be maintained.

In another embodiment, the network resources obligated to serve the user that are caused to be released may further include archiving data representative of network resources to be served to the user, and the archived data may be deleted from the data repository. Additionally, a determination that network usage data exceeds the threshold level after archiving the data representative of network resources to be served to the user may be made, and the network resources available to the user may be restored.

The systems and methods use a specially-programmed computer system that has the capability to perform the complex computations and automated functionality that cannot be reasonably performed by a person. The computations and functionality are envisioned to be performed by a non-human system, including hardware, software, and/or firmware. The computations and functionality require cannot be performed by a generic computer, but rather a specially-programmed computer that is configured to perform the complex computations and functionality described herein. The techniques and processes described herein may also improve the efficiency of the specially-programmed computer by performing discrete tasks that can more optimally process data.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method for reducing obligated network resources, said method comprising:
    establishing, by a computing device, network resources obligated to serve a user for use of a networked electronic device on a communications network;
    collecting, in a data repository, network usage data of the networked electronic device of the user operating on the communications network over a time period;
    determining, by the computing device, whether the network usage data exceeds a minimum usage threshold level over the time period;
    in response to the computing device determining that the network usage data exceeds the minimum usage threshold level over the time period, maintaining the network resources obligated to serve the user,
    otherwise, in response to the computing device determining that the network usage data does not exceed the minimum usage threshold level over the time period, causing the network resources obligated to serve the user to be released, thereby reducing obligated network resources of the communications network;
    wherein the network resources are secondary network resources to a primary network resource of which the user uses the networked electronic device on the communications network; and
    wherein the primary network resources are talk time.

2. The method according to claim 1, wherein establishing network resources includes allocating a predetermined amount of data communications services for the user to consume with data communications.

3. The method according to claim 2, wherein allocating the predetermined amount of data communication services for the user to consume includes allocating a data rate at which the data communications services is to communicate data for the user.

4. The method according to claim 2, wherein allocating a predetermined amount of data communications services includes allocating a predetermined number of data messages for the user to communicate.

5. The method according to claim 1, wherein establishing network resources includes allocating a predetermined amount of data storage available for the user of the networked electronic device to access to store data.

6. The method according to claim 5, wherein allocating a predetermined amount of data storage includes allocating the predetermined amount of storage without the ability to reuse the predetermined amount of storage after storing data therein.

7. The method according to claim 1, wherein establishing network resources includes establishing the network resources without establishing an expiration date for the user to consume the network resources.

8. The method according to claim 1, wherein collecting network usage data over a predetermined time period includes collecting the network usage data over a multi-month time period.

9. The method according to claim 1, wherein causing the network resources to be released includes deleting data in a data storage unit.

10. The method according to claim 1, wherein causing the network resources to be released includes:
    deallocating a network address associated with the networked electronic device of the user; and
    turning the network address back into a routing guide inclusive of network addresses of multiple service providers for reallocation to another user.

11. The method according to claim 10, wherein deallocating a network address includes deallocating a telephone number.

12. The method according to claim 1, wherein establishing the network resources obligated to serve a user for a networked electronic device includes establishing the network resources obligated to serve the user to use a mobile device.

13. The method according to claim 1, wherein establishing network resources includes establishing roaming time on at least one second communications network for use by the user of the networked electronic device.

14. The method according to claim 1, wherein establishing network resources includes establishing international communications time for use by the user of the networked electronic device.

15. The method according to claim 1, further comprising:
determining whether the network usage data exceeds a maximum threshold level; and
in response to determining that the network usage data exceeds the maximum threshold level, causing the network resources obligated to serve the user to be released, thereby reducing the obligated network resources,
otherwise, in response to determining that the network usage data does not exceed the maximum threshold level, maintaining the network resources obligated to serve the user.

16. The method according to claim 15, wherein responsive to determining that the network usage data exceeds the minimum usage threshold level and does not exceed the maximum threshold level over the time period, and exceeds the second threshold level, applying, by the processing unit, the amount of obligated network resources being released to enable the user to have additional network resources during the time period.

17. The method according to claim 1, wherein
causing the network resources obligated to serve the user to be released further includes archiving data representative of network resources to be served to the user; and
deleting the archived data from the data repository.

18. The method according to claim 17, further comprising:
determining that network usage data exceeds the threshold level after archiving the data representative of network resources to be served to the user, and
restoring the network resources available to the user.

19. The method according to claim 1, wherein determining includes determining, by the computing device, whether the network usage data does not exceed a maximum threshold level over the time period.

20. The method according to claim 19, wherein the maximum threshold level is dynamic.

21. The method according to claim 19, wherein determining whether the network usage data does not exceed a maximum threshold level includes determining whether the network usage data does not exceed a maximum threshold level of available balance of non-reusable, obligated network resources associated with the user.

22. The method according to claim 1, wherein the communications network is a telecommunications network, and wherein determining whether the network usage data exceeds a minimum usage threshold level includes determining whether the network usage data is indicative of voice call usage.

23. The method according to claim 22, wherein maintaining the network resources includes maintaining anytime voice call minutes that do not have an expiration date.

* * * * *